United States Patent [19]

Yamamoto et al.

[11] Patent Number: 5,242,649

[45] Date of Patent: Sep. 7, 1993

[54] MOLDED CALCIUM SILICATE ARTICLES AND METHOD FOR PRODUCING SAME

[75] Inventors: Akio Yamamoto; Hideo Uchiyama; Naohide Torigoe, all of Ube; Masaaki Nagai, Shimonoseki, all of Japan

[73] Assignee: Ube Industries, Ltd., Yamaguchi, Japan

[21] Appl. No.: 689,700

[22] Filed: Apr. 19, 1991

[30] Foreign Application Priority Data

Apr. 24, 1990 [JP] Japan .................... 2-106456

[51] Int. Cl.$^5$ .................... B28B 1/26; B28B 3/00
[52] U.S. Cl. .................... 264/333; 106/634; 106/638; 106/711; 106/802; 264/86; 264/87
[58] Field of Search .................... 264/333, 86, 87, 109, 264/122; 106/634, 638, 802, 711

[56] References Cited

U.S. PATENT DOCUMENTS

| | | | |
|---|---|---|---|
| 3,857,918 | 12/1974 | Wyss et al. | 264/333 X |
| 3,880,972 | 4/1975 | Towne et al. | 264/86 X |
| 3,914,361 | 10/1975 | Shiina et al. | 264/310 X |
| 3,953,565 | 4/1976 | Mizutani et al. | 264/210.4 X |
| 4,002,713 | 1/1977 | Duncan et al. | 264/333 X |
| 4,046,846 | 9/1977 | Fujimori | 264/211 X |
| 4,048,276 | 9/1977 | Hansen et al. | 264/256 X |
| 4,162,924 | 7/1979 | Kubo et al. | 106/674 X |
| 4,187,210 | 2/1980 | Howard, Jr. | 264/319 X |
| 4,193,958 | 3/1980 | Uchida et al. | 264/333 X |
| 4,295,893 | 10/1981 | Takahashi et al. | 106/93 |
| 4,336,301 | 6/1982 | Shaw | 264/110 X |
| 4,388,257 | 6/1983 | Oguri et al. | 264/86 X |
| 4,615,853 | 10/1986 | Aoyama et al. | 264/110 X |
| 4,680,227 | 7/1987 | Aoyagi et al. | 106/18.2 X |
| 4,775,505 | 10/1988 | Kuroda et al. | 264/86 X |
| 4,889,669 | 12/1989 | Suzuki | 264/45.9 |
| 4,904,427 | 2/1990 | Kojima | 264/42 |

OTHER PUBLICATIONS

Chemical Abstracts, vol. 104, No. 6, Feb. 1986, p. 321, No. 38852h.
Chemical Abstracts, vol. 115, No. 2, No. 14267X.

Primary Examiner—Karen Aftergut
Attorney, Agent, or Firm—Flynn, Thiel, Boutell & Tanis

[57] ABSTRACT

A hydrated calcium silicate slurry composition is made up of 100 parts by weight of hydrated calcium silicate, 5 to 40 parts by weight of a powdered resin and water and molded articles are produced therefrom. In addition to the above components, 1 to 30 parts by weight of a reinforcing fiber and/or 20 to 35 parts by weight (as solids) of a latex or emulsion may be used. When the latex or emulsion is used, the powdered resin is reduced to an amount of 5 to 20 parts by weight. Since the molded calcium silicate articles have a superior workability and a good thermal dimensional stability, they are very useful especially in the preparation of molds or models where high levels of processing precision and thermal stability are required.

20 Claims, No Drawings

MOLDED CALCIUM SILICATE ARTICLES AND METHOD FOR PRODUCING SAME

BACKGROUND OF THE INVENTION

1. Field of the invention

This invention relates to molded calcium silicate articles having a superior workability and a method for producing the same.

More particularly, this invention relates to molded calcium silicate articles comprising hydrated calcium silicate and powdered resin, which have an advantageous combination of properties of light weight high refractoriness and good dimensional stability together with a workability comparable with or better than wooden materials and which are suitable as materials for the fabrication of various molds, models and structural components used in art and industrial applications and can be subjected to processing operations while greatly reducing the amount of generated dust. This invention is also directed to a method for the production of such useful molded calcium silicate articles.

2. Description of the Prior Art

Hydrated calcium silicate is sold as various molded articles because of its advantageous properties of light weight and thermal stability. Particularly, attempts have been made to produce artificial wood-like materials by molding hydrated calcium silicate having a bulk density of 0.3 to 0.7 g/cm$^3$. There may be mentioned the following molded calcium silicate articles.

(1) Molded calcium silicate prepared by molding an aqueous slurry consisting of 100 parts by weight of hydrated calcium silicate, 10 to 150 parts by weight of hydraulic gypsum, 5 to 30 parts by weight of a polymer emulsion, a coagulating agent for the polymer emulsion, water and reinforcing fiber, and drying the resultant molded body (Japanese Patent Application Laid-Open No. 54-160 428)

(2) Molded calcium silicate prepared by molding an aqueous slurry consisting of 100 parts by weight of hydrated calcium silicate and 5 to 30 parts by weight (as solid content) of a latex of styrene-butadiene copolymer having carboxyl groups, a cationic high molecular weight coagulant and water, and drying the resultant molded bodies (Japanese Patent Application Laid-Open No. 60 - 246 251)

Further, in order to improve the disadvantages of the above prior inventions, the present applicant has proposed the following calcium silicate molded articles.

(3) Molded calcium silicate consisting of 100 parts by weight of hydrated calcium silicate, 1 to 30 parts by weight of a reinforcing fiber, 1 to 40 parts by weight of a latex and 0.1 to 5 parts by weight of a dispersant (Japanese Patent Application Laid-Open No. 62 - 123 053)

(4) Molded calcium silicate prepared by adding a substance capable of forming ettringite by reaction with water in an amount of 1 to 15 parts by weight relative to 100 parts by weight of hydrated calcium silicate, into the composition of the molded calcium silicate proposed in (3) (Japanese Patent Application Laid-Open No. 62 - 235 276)

However, since the molded calcium silicate set forth in (1) has an insufficient bending strength, at most about 100 kgf/cm$^2$, and includes a large amount of hydraulic gypsum, the molded calcium silicate articles will present problems in machinability, dusting characteristics, thermal resistance and dimensional stability, when it is subjected to processing operations.

The molded calcium silicate articles mentioned above in (2), (3) and (4) were developed especially with the object of improving thermal resistance and strength among the physical properties as mentioned in the molded calcium silicate (1), and almost no attention has been paid to the problems of machinability and dust produced during machining operations.

SUMMARY OF THE INVENTION

It is therefore an object of the present invention to provide molded calcium silicate articles useful as structural materials, especially for molds, models and sculptures in which a high degree of dimensional precision is required.

Another object of the present invention is to provide a method for producing such molded calcium silicate articles.

The objects of the present invention can be achieved by the hydrated calcium silicate slurry compositions, molded calcium silicate articles and methods for the production thereof, as specified below.

(1) A hydrated calcium silicate slurry composition consisting of 100 parts by weight of hydrated calcium silicate, 5 to 40 parts by weight of a powdered resin and water.

(2) A method for producing a hydrated calcium silicate slurry composition, comprising:

preparing a hydrated calcium silicate slurry by hydrothermal reaction of siliceous material, calcareous material and water, and adding to and mixing with the slurry 5 to 40 parts by weight of a powdered resin having an average particle diameter of 10 to 200 μm per 100 parts by weight of hydrated calcium silicate dispersed in the slurry.

(3) A molded calcium silicate article produced by molding a hydrated calcium silicate slurry composition consisting of 100 parts by weight of hydrated calcium silicate, 5 to 40 parts by weight of a powdered resin and water and drying the resultant molding.

(4) A method for producing a molded calcium silicate article, comprising:

preparing a hydrated calcium silicate slurry by hydrothermal reaction of siliceous material, calcareous material and water;

adding to and mixing with the slurry 5 to 40 parts by weight of a powdered resin having an average particle diameter of 10 to 200 μm per 100 parts by weight of hydrated calcium silicate dispersed in the slurry to provide a hydrated calcium silicate slurry composition;

molding the slurry composition; and drying the resultant molding.

(5) A hydrated calcium silicate slurry composition consisting of 100 parts by weight of hydrated calcium silicate, 5 to 20 parts by weight of a powdered resin, 20 to 35 parts by weight (as solid) of a latex or emulsion and water.

(6) A method for producing a hydrated calcium silicate slurry composition, comprising:

preparing a hydrated calcium silicate slurry by hydrothermal reaction of siliceous material, calcareous material and water; and adding to and mixing with the slurry 5 to 20 parts by weight of a powdered resin having an average particle diameter of 10 to 200 μm and 20 to 35 parts by weight (as solid) of a latex or emulsion, with respect to 100 parts by weight of hydrated calcium silicate dispersed in the slurry.

(7) A molded calcium silicate article produced by molding a hydrated calcium silicate slurry composition consisting of 100 parts by weight of hydrated calcium silicate, 5 to 20 parts by weight of a powdered resin, 20 to 35 parts by weight (as solid) of a latex or emulsion and water, and drying the resultant molding.

(8) A method for producing a molded calcium silicate article, comprising:

preparing a hydrated calcium silicate slurry by hydrothermal reaction of siliceous material, calcareous material and water;

adding to and mixing with the slurry 5 to 20 parts by weight of a powdered resin having an average particle diameter of 10 to 200 $\mu$m and 20 to 35 parts by weight (as solids) of a latex or emulsion, with respect to 100 parts by weight of hydrated calcium silicate dispersed in the slurry to provide a hydrated calcium silicate slurry composition;

molding the slurry composition; and drying the resultant molding.

In the above-mentioned hydrated calcium silicate slurry compositions, molded calcium silicate articles and the production methods thereof, the hydrated calcium silicate slurry compositions may further contain reinforcing fiber in a proportion of 1 to 30 parts by weight relative to 100 parts by weight of the hydrated calcium silicate dispersed in the compositions.

DETAILED DESCRIPTION OF THE PREFERRED EMBODIMENTS

The molded calcium silicate articles of the present invention are produced as follows. A hydrated calcium silicate slurry is prepared by the hydrothermal reaction of siliceous material, calcareous material and water, and the hydrated calcium silicate slurry is intimately mixed with a powdered resin to form a hydrated calcium silicate slurry composition. In the mixing procedure, a reinforcing fiber and/or a latex or emulsion may be added, if necessary. The hydrated calcium silicate slurry composition is molded and dried. In the present invention, improvement in workability and suppression of dust, which have heretofore been sought in conventional molded calcium silicate articles, can be achieved at the same time by adding a thermoplastic resin capable of melting by heating during the production procedure or a thermosetting resin capable of forming a three-dimensional structure by chemical reaction, in a certain amount.

Heretofore, in order to improve the workability of molded calcium silicate materials, a certain latex or emulsion has been used in an amount of 20 to 40 parts by weight per 100 parts by weight of hydrated calcium silicate. Resin particles in latexes or emulsions usually have a particle size of not greater than 1 $\mu$m and, when such latexes or emulsions are added to hydrated calcium silicate, the resin particles will enter the hydrated calcium silicate structure. Consequently, the effective amount of latexes or emulsions which actually serve for agglomeration of hydrated calcium silicate are less than the actually added amount. For example, when an aegagropia-like xonotlite ($6CaO.6SiO_2.H_2O$) is used as hydrated calcium silicate, a significant amount of resin particles of the used latex or emulsion go into the aegagropia-like xonotlite and, as a result, the amount of the resin particles effectively promoting agglomeration of the aegagropia-like xonotlite are reduced.

On the other hand, when the resin particles have an average particle diameter of 10 $\mu$m or greater, they can not enter the hydrated calcium silicate. Therefore, resin particles providing an effective contribution to the agglomeration of hydrated calcium silicate are increased, thereby improving the workability of the resulting molded calcium silicate and suppressing the generation of dust.

In conventional production processes of molded calcium silicate articles, foaming takes place due to the presence of a surfactant contained in a latex or emulsion, thereby causing serious problems such as bulging, flaking, chipping, etc., in the resultant calcium silicate molded products. Further, in the prior art, a certain special chemical treatment is needed in handling filtered water after molding. The present invention also eliminates such problems.

Latexes or emulsions of the following polymers may be employed in the present invention. Namely, styrene-butadiene copolymer, acrylonitrile-butadiene copolymer, polybutadiene, methyl methacrylate-butadiene copolymer, isoprene polymer (or copolymer), ethylene-propylene copolymer, etc. These latexes or emulsions effectively act in the agglomeration of hydrated calcium silicate and agglomeration of hydrated calcium silicate and the reinforcing fiber. Therefore, nails or wood screws can be firmly fixed in the molded calcium silicate block and its machinability during cutting operations is greatly improved. The latex or emulsion is usually used in an amount of 20 to 35 parts by weight per 100 parts by weight of hydrated calcium silicate. When the amount of the latex or emulsion is less than 20 parts by weight, no significant workability improving effect is obtained. When the amount of the latex or emulsion exceeds 35 parts by weight, generation of dust is considerable, although its machinability when cutting with a plane or chisel is good. Further, when the latex or emulsion is used in such excessive amounts above 35 parts by weight, a surfactant, such as rosin soap, which is contained in the latex or emulsion, may cause foaming in the slurry mixture during the production procedure of the molded calcium silicate, resulting in bulging, flaking, chipping and formation of scale-like patterns in the press-molded products. Consequently, the quality of the products are considerably deteriorated and processing and painting operations can not be uniformly conducted.

In order to suppress such undesirable effects of the surfactant, it is possible to use an antifoaming agent. However, when the antifoaming agent decomposes it acts like a foaming agent and provides difficulties in handling filtered water in the water treatment step.

The present inventors have studied the above-mentioned problems associated with latexes or emulsions and found that such problems encountered in the prior art can be overcome by using powdered resin either singly or in combination with latexes or emulsions.

From the above-mentioned consideration about the workability of the molded calcium silicate articles and the unfavorable effects of surfactants, a latex or emulsion is preferably mixed in an amount of 20 to 35 parts by weight relative to 100 parts by weight of hydrated calcium silicate. In this latex or emulsion mixing range, addition of 5 to 20 parts by weight of the powdered resin provides a significant effect.

When a latex or emulsion is not added or addition of them is 10 parts by weight or less, the powdered resin is preferably added in a proportion of 5 to 40 parts by weight relative to 100 parts by weight of hydrated calcium silicate. When the addition of the powdered resin is less than 5 parts by weight, the silicates workability is deteriorated and generation of dust produced during processing operations is considerably increased. When the amount of the powdered resin exceeds 40 parts by weight in the absence of a latex or emulsion or it exceeds 20 parts by weight in the presence of 20 to 35 parts by weight of the latex or emulsion, its thermal dimensional stability is drastically lowered, although improvements can be obtained in workability and dust prevention. Molded calcium silicate materials having such a low dimensional stability are undesirable for the preparation of molds, models and other structural members where a high degree of dimensional stability is required.

As the powdered resin, powdered thermoplastic resins or thermosetting resins having an average particle diameter of 10 to 200 μm can be used in the present invention. An average particle diameter exceeding 200 μm provides spotted and fuzzy cut surfaces when machining the molded calcium silicate materials and after-treatments such as painting will be adversely affected. When the average particle diameter is less than 10 μm, filtration press becomes difficult, since such a fine resin powder passes through a mesh of a filter cloth. Further, since some of the resin particles enter the calcium silicate structure, they can not effectively exert their cementing action upon calcium silicate. Consequently, it is difficult to improve the silicates workability and prevent the generation of dust.

Incidentally, the powdered resin usually has a specific gravity of not greater than 1. Therefore, when the powdered resin is added to a hydrated calcium slurry, it may float on the surface of the slurry. In order to prevent such a phenomenon, an appropriate coagulant and thickener should be previously incorporated into the hydrated calcium silicate slurry and then the resin powder added to the slurry. Alternatively, the powdered resin is in advance uniformly dispersed in water, using a polar solvent, such as alcohols, and a dispersant, and then added to the hydrated calcium silicate slurry. Besides the coagulant, thickener, polar solvent and dispersant, a filter aid, such as perlite, diatomaceous earth, bentonite, etc., may be used, if necessary.

Hydrated calcium silicates which are produced by known processes can be employed in the present invention and, particularly, hydrated calcium silicates which are usually referred to as "xonotlite" or "tobermorite" produced by the hydrothermal reaction of calcareous material, siliceous material and water may be preferably used. In the preparation of the molded calcium silicate articles, the hydrated calcium silicates are used in the form of slurry.

In addition to the above components, a reinforcing fiber may be used. As the reinforcing fiber, there may be used inorganic fibers, such as glass fiber, carbon fiber, rock fiber, etc.; organic fibers, such as nylon, polypropylene, rayon, vinylon, etc.; and natural fibers prepared from conifer, broad-leaved tree, hemp, etc. The reinforcing fiber improves the strength and the modules of elasticity of the molded calcium silicate articles. Further, in the production of the molded calcium silicate articles, the reinforcing fiber improves the retention properties of the components, i.e., hydrated calcium silicate, latex or emulsion, and other additives, in the slurry and facilitates filtering and separation when press molding. Therefore, in applications where such properties are important, it is highly desirable to use the reinforcing fiber. Taking into consideration the workability and heat resistance of the resultant molded materials, the amount of the reinforcing fiber to be added is in the range of 1 to 30 parts by weight, preferably 3 to 10 parts by weight, per 100 parts by weight of hydrated calcium silicate. Especially, in the molded calcium silicate articles of the present invention, it is preferable to utilize a glass fiber having a diameter of not greater than 12 μm, more preferably a glass fiber having a diameter of 6 to 9 μm. Organic fibers or natural fibers can also be utilized, but these fibers are unfavorable because they may cause problems in cutting with a cutter, resulting in uneven cut faces or other undesirable phenomena.

Mixing of the hydrated calcium silicate slurry, powdered resin, reinforcing fiber, and latex or emulsion, etc., is carried out by mixers or kneaders customarily used.

The uniformly dispersed hydrated calcium silicate slurry composition is then molded into a block material having desired dimensions.

As a method for molding the hydrated calcium silicate slurry composition, there may be mentioned a filtration press, wire cylinder molding and filter press molding. According to the purpose and the intended use, an appropriate molding method has to be selected. For example, the filtration press is useful in the production of molded block materials for the fabrication of thick molds or models having a large specific gravity. The wire cylinder molding and filter press molding are useful in the preparation of molded block materials for the fabrication of thin molds or models having a small specific gravity.

After molding, the molded articles are dried and the desirable molded calcium silicate articles having a superior workability can be obtained. Although the drying temperature should be adjusted depending on the softening temperature or cross-linking temperature of the used powdered resin, it is usually in the range of 100° to 180° C. When the drying temperature is lower than 100° C., the powdered resin is not fused together or does not form a three-dimensional structure and a considerable chalking phenomenon will occur when the molded calcium silicate is subjected to machining operations. When the drying temperature exceeds 180° C., serious problems may arise. For example, in some kinds of resins, decomposition of the powdered resins occurs, thereby resulting in an undesirable decoloring of the molded articles or formation of pores in the molded articles.

Now, the present invention will be described in detail with reference to the following Examples and Comparative Examples.

Tests used in the Examples and Comparative Examples were carried out by the following procedures.

(1) Chalking Index (Test of dusting characteristics when cutting work)

Each molded calcium sample was cut with a cutter (trade name: NT CUTTER L 500 by NT Kabushiki Kaisha). An adhesive tape, 18 mm wide, was applied onto the cut surface of the sample and removed to examine the degree of adhesion of calcium silicate dust onto the adhesive tape. The results were rated in five grades of 1 to 5 according to the adhesion state. The small grade number means that the adhesion of the calcium silicate dust is slight. Specifically, grade "1" indicates no adhesion of the calcium silicate dust and grade "5" indicates that the adhesive tape was entirely covered with the dust.

(2) Workability i) Plane Workability:

Each molded calcium silicate sample was planed and shavings cut off by planing were examined. In this test, curly shavings are desirable and irregularly chipped shavings are undesirable.

ii) Saw Workability:

Each molded calcium silicate sample was cut with a saw and the cut state was evaluated from the resulting sawdust.

iii) A nail, 4.5 mm in diameter and 120 mm long, was driven into each molded calcium silicate sample under a load of 30 kgf/cm$^2$ an penetration depth was measured. Large penetration depths mean that the nail was easily driven into the molded calcium silicate.

iv) Thermal Dimensional Stability:

Thermal shrinkage at a temperature of 1000° C. was measured for each molded calcium silicate.

v) Bending Strength

Bending strength was measured for each molded calcium silicate sample in accordance with the bending strength testing method for board materials used for buildings specified in Japanese Industrial Standard (JIS) A 1408.

EXAMPLE 1

Powdered silica and slaked lime were mixed in a proportion such that the molar ratio of SiO$_2$:CaO is 1:1 and water was added in an amount of 13 times by weight of the total weight of CaO and SiO$_2$ to cause a hydrothermal reaction. The hydrothermal reaction was carried out, with stirring, at 210° C. under a pressure of 19 kgf/cm$^2$ for 5 hours in an autoclave. To the resultant hydrated calcium silicate slurry, the following substances were added. The added amounts are indicated by parts by weight relative to 100 parts by weight of hydrated calcium silicate.

Sytrene-butadinene copolymer latex (produced by Nippon Zeon Co., Ltd. under the trade name: UZ-1): 10 parts by weight (as solid)

Hydroxycarboxylic acid dispersant (produced by Fujisawa Pharmaceutical Co., Ltd., under the trade name: PARIC #1): 3 parts by weight Calcium sulfoaluminate expansive agent (produced by Denki Kagaku Kogyo K.K. under the trade name: CSA#20): 5 parts by weight Dispersion liquid prepared by dispersing 10 parts by weight of polyethylene powder (produced by Ube Industries Ltd. under the trade name UMC 950) in a solution consisting of 2 parts by weight of ethanol and 28 parts by weight of water: 40 parts by weight (The same polyethylene powder was used in the following Examples and Comparative Examples.)

3 parts by weight of glass fiber (produced by Nitto Boseki Co., Ltd. under the trade name: CS 12-GYUD) was added to the above mixture and mixed together to provide a hydrated calcium silicate slurry composition.

The polyethylene powder used in this example was measured using a particle counter by light scattering method (made by Compagnie Insustrielle Des Lasers under the trade name: LASER Granulometer Model 715). The average particle diameter was 40 μm. The average particle diameters of powdered resins used in the following examples and comparative examples were also measured using the same particle counter by the light scattering method.

The thus obtained hydrated calcium silicate slurry composition was filled into a mold (30cm × 30cm), press dehydrated under a pressure of 50 kgf/cm$^2$, and dried at 130° C. for 14 hours to provide a molded calcium silicate block.

The test results of the molded calcium silicate block are in Table 1.

EXAMPLE 2

A molded calcium silicate block was prepared in the same way as described in Example 1 except that in the preparation of the hydrated calcium silicate slurry composition set forth in Example 1, the styrene-butadiene copolymer latex was omitted.

The test results of the molded calcium silicate block are shown in Table 1.

EXAMPLE 3

A molded calcium silicate block was prepared in the same way as described in Example 1 except that the preparation of the hydrated calcium silicate slurry composition set forth in Example 1 was altered as follows. The styrene-butadiene copolymer latex was omitted and the amount of the dispersion liquid was changed to 80 parts by weight by changing the amount of the polyethylene powder to 20 parts by weight and increasing the amounts of ethanol and water to 4 parts by weight and 56 parts by weight, respectively The test results of the resulting molded calcium silicate block are shown in Table 1.

EXAMPLE 4

A molded calcium silicate block was prepared in the same way as described in Example 1 except that the preparation of the hydrated calcium silicate slurry composition set forth in Example 1 was altered as follows. The styrene-butadiene copolymer latex was omitted and the amount of the dispersion liquid was changed to 160 parts by weight by changing the amount of the polyethylene powder to 40 parts by weight and increasing the amounts of ethanol and water to 8 parts by weight and 112 parts by weight, respectively.

The test results of the resulting molded calcium silicate block are shown in Table 1.

EXAMPLE 5

A molded calcium silicate block was prepared in the same way as described in Example 1 except that the preparation of the hydrated calcium silicate slurry composition set forth in Example 1 was altered as follows. The styrene-butadiene copolymer latex was omitted, 20 parts by weight of phenol powdered resin produced by Meiwa Plastic Industries Ltd. under the trade name MR-110, average particle diameter: 70 μm) was added in place of the polyethylene powder in the dispersion liquid and the amount of the dispersion liquid was changed to 80 parts by weight by increasing ethanol and water to 4 parts by weight and 56 parts by weight, respectively.

The test results of the molded calcium silicate block are shown in Table 1.

EXAMPLE 6

A molded calcium silicate block was prepared in the same way as described in Example 1 except that the preparation of the hydrated calcium silicate slurry composition set forth in Example 1 was altered as follows. The styrene-butadiene copolymer latex was omitted, 20 parts by weight of ethylene-vinyl acetate copolymer resin powder (produced by Hoechst Gosei K. K. under the trade name movinyl powder E45, average diameter: 70 μm) was added in place of the polyethylene powder in the dispersion liquid and the amount of the dispersion liquid was changed to 80 parts by weight by increasing the ethanol and water to 4 parts by weight and 56 parts by weight, respectively.

The test results of the obtained molded calcium silicate block are shown in Table 1.

EXAMPLE 7

A molded calcium silicate block was prepared in the same way as described in Example 1 except that the preparation of the hydrated calcium silicate slurry composition set forth in Example 1 was altered as follows. The styrene-butadiene copolymer latex was omitted and the amount of the dispersion liquid was changed to 80 parts by weight by using 10 parts by weight of the polyethylene powder and 10 parts by weight of the ethylene-vinyl copolymer powdered resin (trade name: movinyl powder E45) in place of 10 parts by weight of the polyethylene powder and increasing the amounts of ethanol and water to 4 parts by weight and 56 parts by weight, respectively.

The test results of the molded calcium silicate block are shown in Table 1.

EXAMPLE 8

A molded calcium silicate block was prepared in the same way as described in Example 1 except that the preparation of the hydrated calcium silicate slurry composition set forth in Example 1 was altered as follows. The amount (as solid) of the styrene-butadiene copolymer latex was increased from 10 parts by weight to 20 parts by weight and the amount of the dispersion liquid was changed to 80 parts by weight by using 20 parts by weight of the polyethylene powder and increasing the amounts of ethanol and water to 4 parts by weight and 56 parts by weight, respectively.

The test results of the molded calcium silicate block are shown in Table 1.

EXAMPLE 9

A molded calcium silicate block was prepared in the same way as described in Example 1 except that in the preparation of the hydrated calcium silicate slurry composition set forth in Example 1, the amount (as solid) of the styrene-butadiene copolymer latex was changed from 10 parts by weight to 30 parts by weight.

The test results of the molded calcium silicate block are shown in Table 1.

EXAMPLE 10

A molded calcium silicate block was prepared in the same way as described in Example 1 except that the preparation of the hydrated calcium silicate slurry composition set forth in Example 1 was altered as follows. The amount (as solid) of the styrene-butadiene copolymer latex was changed from 10 parts by weight to 35 parts by weight and the amount of the dispersion liquid was changed to 35 parts by weight using 5 parts by weight of the polyethylene powder.

The test results of the molded calcium silicate block are shown in Table 1.

EXAMPLE 11

A molded calcium silicate block was prepared in the same way as described in Example 1 except that in the preparation of the hydrated calcium silicate slurry composition set forth in Example 1, the glass fiber was omitted.

The test results of the molded calcium silicate block are shown in Table 1.

EXAMPLE 12

A molded calcium silicate block was prepared in the same way as described in Example 2 except that in the preparation of the hydrated calcium silicate slurry composition, the glass fiber was omitted.

The test results of the molded calcium silicate block are shown in Table 1.

EXAMPLE 13

A molded calcium silicate block was prepared in the same way as described in Example 1 except that in the preparation of the hydrated calcium silicate slurry composition set forth in Example 1, the addition of the glass fiber was changed to 25.

The test results of the molded calcium silicate block are shown in Table 1.

COMPARATIVE EXAMPLE 1

A molded calcium silicate block was prepared in the same way as described in Example 1 except that in the preparation of the hydrated calcium silicate slurry composition set forth in Example 1, the dispersion liquid including the polyethylene powder was omitted.

The test results of the molded calcium silicate block are shown in Table 1.

COMPARATIVE EXAMPLE 2

A molded calcium silicate block was prepared in the same way as described in Example 1 except that in the preparation of the hydrated calcium silicate slurry composition set forth in Example 1, the dispersion liquid including the polyethylene powder was omitted and the amount (as solids) of the styrene-butadiene copolymer latex was increased from 10 parts by weight to 20 parts by weight.

The test results of the molded calcium silicate block are shown in Table 1.

COMPARATIVE EXAMPLE 3

A molded calcium silicate block was prepared in the same way as described in Example 1 except that in the preparation of the hydrated calcium silicate slurry composition set forth in Example 1, the dispersion liquid including the polyethylene powder was omitted and the amount (as solids) of the styrene-butadiene copolymer latex was increased from 10 parts by weight to 40 parts by weight.

The test results of the molded calcium silicate block are shown in Table 1..

COMPARATIVE EXAMPLE 4

A molded calcium silicate block was prepared in the same way as described in Example 1 except that the following alterations were made in the hydrated calcium silicate slurry composition set forth in Example 1. The amount (as solids) of the styrene-butadiene copolymer latex was changed from 10 parts by weight to 20 parts by weight and the amount of the dispersion liquid was increased to 200 parts by weight by using 50 parts by weight of the polyethylene powder and increasing the amounts of ethanol and water to 10 parts by weight and 140 parts by weight, respectively.

The test results of the molded calcium silicate block are shown in Table 1.

COMPARATIVE EXAMPLE 5

A molded calcium silicate block was prepared in the same way as described in Example 1 except that the following alterations were made in the hydrated calcium silicate slurry composition set forth in Example 1. The amount (as solid) of the styrene-butadiene copolymer latex was changed from 10 parts by weight to 40 parts by weight and the amount of the dispersion liquid was increased to 200 parts by weight by using 50 parts by weight of the polyethylene powder and increasing the amounts of ethanol and water to 10 parts by weight and 140 parts by weight, respectively.

The test results of the molded calcium silicate block are shown in Table 1.

COMPARATIVE EXAMPLE 6

A molded calcium silicate block was prepared in the same way as described in Example 11 except that in the preparation of the hydrated calcium silicate slurry composition set forth in Example 11, the dispersion liquid including the polyethylene powder was omitted.

The test results of the molded calcium silicate block are shown in Table 1.

COMPARATIVE EXAMPLE 7

A molded calcium silicate block was prepared in the same way as described in Example 12 except that in the preparation of the hydrated calcium silicate slurry composition set forth in Example 12, the dispersion liquid including the polyethylene powder was omitted.

The test results of the molded calcium silicate block are shown in Table 1.

COMPARATIVE EXAMPLE 8

A molded calcium silicate block was prepared in the same was as described in Example 1 except that in the preparation of the hydrated calcium silicate slurry composition set forth in Example 1, the addition of the glass fiber was changed to 35 parts by weight.

The test results of the molded calcium silicate block are shown in Table 1.

TABLE 1

Compositions of Molded Calcium Silicate Blocks

Compound Ingredients (part by weight)

| | Glass Fiber | Latex | Dispersant | Expansive Agent | Polyethylene | Phenol Resin | Ethylene Vinyl Acetate Copolymer |
|---|---|---|---|---|---|---|---|
| Example | | | | | | | |
| 1 | 3 | 10 | 3 | 5 | 10 | 0 | 0 |
| 2 | 3 | 0 | 3 | 5 | 10 | 0 | 0 |
| 3 | 3 | 0 | 3 | 5 | 20 | 0 | 0 |
| 4 | 3 | 0 | 3 | 5 | 40 | 0 | 0 |
| 5 | 3 | 0 | 3 | 5 | 0 | 20 | 0 |
| 6 | 3 | 0 | 3 | 5 | 0 | 0 | 20 |
| 7 | 3 | 0 | 3 | 5 | 10 | 0 | 10 |
| 8 | 3 | 20 | 3 | 5 | 20 | 0 | 0 |
| 9 | 3 | 30 | 3 | 5 | 10 | 0 | 0 |
| 10 | 3 | 35 | 3 | 5 | 5 | 0 | 0 |
| 11 | 0 | 10 | 3 | 5 | 10 | 0 | 0 |
| 12 | 0 | 0 | 3 | 5 | 10 | 0 | 0 |
| 13 | 25 | 10 | 3 | 5 | 10 | 0 | 0 |
| Comparative Example | | | | | | | |
| 1 | 3 | 10 | 3 | 5 | 0 | 0 | 0 |
| 2 | 3 | 20 | 3 | 5 | 0 | 0 | 0 |
| 3 | 3 | 40 | 3 | 5 | 0 | 0 | 0 |
| 4 | 3 | 20 | 3 | 5 | 50 | 0 | 0 |
| 5 | 3 | 40 | 3 | 5 | 50 | 0 | 0 |
| 6 | 0 | 10 | 3 | 5 | 0 | 0 | 0 |
| 7 | 0 | 0 | 3 | 5 | 0 | 0 | 0 |
| 8 | 35 | 10 | 3 | 5 | 10 | 0 | 0 |

Test Results

| | Surface State of Molded Block | | Chalking Index | Workability | | Penetration Depth of Nail (mm) | Thermal Dimensional Stability | Bulk Density | Bending Strength (kgf/cm$^2$) |
|---|---|---|---|---|---|---|---|---|---|
| | Pore Formation | Flaking | | Plane* | Saw | | | | |
| Example | | | | | | | | | |
| 1 | no | no | 2 | A | good | 7.48 | good | 0.51 | 71 |
| 2 | no | no | 3 | A | good | 6.97 | good | 0.50 | 65 |
| 3 | no | no | 2 | A | good | 7.52 | good | 0.52 | 75 |
| 4 | no | no | 1 | A | very good | 8.89 | good | 0.50 | 81 |
| 5 | no | no | 2 | A | good | 7.66 | good | 0.49 | 77 |
| 6 | no | no | 2 | A | good | 7.06 | good | 0.50 | 80 |
| 7 | no | no | 2 | A | good | 8.11 | good | 0.50 | 82 |
| 8 | no | slight | 2 | A | good | 6.05 | good | 0.53 | 85 |
| 9 | slight | slight | 2 | A | good | 5.31 | good | 0.48 | 91 |
| 10 | slight | slight | 2 | A | good | 5.61 | good | 0.49 | 84 |
| 11 | no | no | 2 | A | good | 7.25 | good | 0.50 | 43 |
| 12 | no | no | 3 | A | good | 6.90 | good | 0.51 | 46 |
| 13 | no | no | 2 | A | good | 7.32 | good | 0.50 | 95 |
| Comparative Example | | | | | | | | | |
| 1 | no | no | 5 | B | poor | 4.79 | good | 0.51 | 61 |

TABLE 1-continued

| | | | | | | | | | |
|---|---|---|---|---|---|---|---|---|---|
| 2 | slight | slight | 4 | B | good | 5.11 | poor | 0.52 | 78 |
| 3 | slight | slight | 4 | B | good | 4.65 | poor | 0.51 | 86 |
| 4 | slight | slight | 1 | A | very good | 6.58 | poor | 0.50 | 80 |
| 5 | slight | slight | 1 | A | very good | 6.00 | poor | 0.49 | 85 |
| 6 | no | no | 3 | B | slightly poor | 5.58 | good | 0.49 | 39 |
| 7 | no | no | 5 | B | poor | 4.30 | good | 0.52 | 35 |
| 8 | slight | slight | 3 | B | poor | 5.18 | good | 0.50 | 80 |

*A: Curly shavings, B: Irregularly chipped shavings

As described above, the hydrated calcium silicate slurry compositions of the present invention are very important as starting materials for the preparation of molded block materials to be fabricated into molds or models where high levels of workability, dimensional stability and processing precision are required. Further, the hydrated calcium silicate slurry compositions are also important as starting materials for molded calcium silicate materials used in the preparation of casting molds where high thermal resistance is required.

The molded calcium silicate articles of the present invention are very suitable as materials for molds or models where a high degree of processing precision is required and as materials for casting molds where high thermal resistance is required, because they have a superior workability and a good dimensional stability.

The invention methods for producing the hydrated calcium silicate slurry composition and molded calcium silicate articles of the present invention reduce surface flaking and formation of pores in the products, thereby providing an improved yield.

What is claimed is:

1. A hydrated calcium silicate slurry composition consisting of 100 parts by weight of hydrated calcium silicate dispersed in water, 5 to 40 parts by weight of a powdered resin and water, the hydrated calcium silicate being formed by a hydrothermal reaction between a siliceous material, a calcareous material and water.

2. A hydrated calcium silicate slurry composition as claimed in claim 1 in which the hydrated calcium silicate slurry composition further contains 1 to 30 parts by weight of a reinforcing fiber relative to 100 parts by weight of the hydrated calcium silicate.

3. A method for producing a hydrated calcium silicate slurry composition, comprising:
preparing a hydrated calcium silicate slurry comprising 100 parts by weight of hydrated calcium silicate dispersed in water by hydrothermal reaction of a siliceous material, a calcareous material and water, and
adding to and mixing with the slurry 5 to 40 parts by weight of a powdered resin having an average particle diameter of 10 to 200 μm per 100 parts by weight of the hydrated calcium silicate dispersed in the water of the slurry to produce the hydrated calcium silicate slurry composition.

4. A method as claimed in claim 3 in which 1 to 30 parts by weight of a reinforcing fiber per 100 parts by weight of the hydrated calcium silicate is added to the slurry with the powdered resin.

5. A molded calcium silicate article produced by molding a hydrated calcium silicate slurry composition consisting of 100 parts by weight of hydrated calcium silicate dispersed in water, 5 to 40 parts by weight of a powdered resin and water and drying the resultant molding, the hydrated calcium silicate being formed by a hydrothermal reaction between a siliceous material, a calcareous material and water.

6. A molded calcium silicate article as claimed in claim 5 in which the hydrated calcium silicate slurry composition further contains 1 to 30 parts by weight of a reinforcing fiber relative to 100 parts by weight of the hydrated calcium silicate.

7. A method for producing a molded calcium silicate article, comprising:
preparing a hydrated calcium silicate slurry comprising 100 parts by weight of hydrated calcium silicate dispersed in water by hydrothermal reaction of siliceous material, calcareous material and water;
adding to and mixing with the slurry 5 to 40 parts by weight of a powdered resin having an average particle diameter of 10 to 200 μm per 100 parts by weight of the hydrated calcium silicate dispersed in the water of the slurry to provide a hydrated calcium silicate slurry composition;
molding the slurry composition; and
drying the resultant molding to produce the molded calcium silicate article.

8. A method as claimed in claim 7 in which 1 to 30 parts by weight of a reinforcing fiber per 100 parts by weight of the hydrated calcium silicate is added to the slurry with the powdered resin.

9. A hydrated calcium silicate slurry composition consisting of 100 parts by weight of hydrated calcium silicate dispersed in water, 5 to 20 parts by weight of a powdered resin, 20 to 35 parts by weight, as solids, of a latex or emulsion and water, the hydrated calcium silicate being formed by a hydrothermal reaction between a siliceous material, a calcareous material and water.

10. A hydrated calcium silicate slurry composition as claimed in claim 9 in which the hydrated calcium silicate slurry composition further contains 1 to 30 parts by weight of a reinforcing fiber relative to 100 parts by weight of the hydrated calcium silicate.

11. A method for producing a hydrated calcium silicate slurry composition, comprising:
preparing a hydrated calcium silicate slurry comprising 100 parts by weight of hydrated calcium silicate dispersed in water by hydrothermal reaction of siliceous material, calcareous material and water; and
adding to and mixing with the slurry 5 to 20 parts by weight of a powdered resin having an average particle diameter of 10 to 200 μm and 20 to 35 parts by weight, as solids, of a latex or emulsion, with respect to the 100 parts by weight of the hydrated calcium silicate dispersed in the water of the slurry, to produce the hydrated calcium silicate slurry composition.

12. A method as claimed in claim 11 in which 1 to 30 parts by weight of a reinforcing fiber per 100 parts by weight of the hydrated calcium silicate is added to the slurry with the powdered resin and latex or emulsion.

13. A molded calcium silicate article produced by molding a hydrated calcium silicate slurry composition consisting of 100 parts by weight of hydrated calcium silicate dispersed in water, 5 to 20 parts by weight of a powdered resin, 20 to 35 parts by weight, as solids, of a latex or emulsion and water, and drying the resultant molding, the hydrated calcium silicate being formed by a hydrothermal reaction between a siliceous material, a calcareous material and water.

14. A molded calcium silicate article as claimed in claim 13 in which the hydrated calcium silicate slurry composition further contains 1 to 30 parts by weight of a reinforcing fiber relative to 100 parts by weight of the hydrated calcium silicate.

15. A method for producing a molded calcium silicate article, comprising:
   preparing a hydrated calcium silicate slurry comprising 100 parts by weight of hydrated calcium silicate dispersed in water by hydrothermal reaction of siliceous material, calcareous material and water;
   adding to and mixing with the slurry 5 to 20 parts by weight of a powdered resin having an average particle diameter of 10 to 200 μm and 20 to 35 parts by weight, as solids, of a latex or emulsion, with respect to the 100 parts by weight of the hydrated calcium silicate dispersed in the water of the slurry, to provide a hydrated calcium silicate slurry composition;
   molding the slurry composition; and
   drying the resultant molding to produce the molded calcium silicate article.

16. A method as claimed in claim 15 in which 1 to 30 parts by weight of a reinforcing fiber per 100 parts by weight of the hydrated calcium silicate is added to the slurry with the powdered resin and latex or emulsion.

17. A hydrated calcium silicate slurry composition as claimed in claim 1 in which the powdered resin is a thermoplastic or thermosetting resin having an average particle diameter of 10 to 200 μm.

18. A hydrated calcium silicate slurry composition as claimed in claim 9 in which the powdered resin is a thermoplastic or thermosetting resin having an average particle diameter of 10 to 200 μm.

19. A molded calcium silicate slurry article as claimed in claim 5, in which the powdered resin is a thermoplastic or thermosetting resin having an average particle diameter of 10 to 200 μm.

20. A molded calcium silicate article as claimed in claim 13, in which the powdered resin is a thermoplastic or thermosetting resin having an average particle diameter of 10 to 200 μm.

* * * * *